United States Patent [19]

Fulton et al.

[11] 4,332,543
[45] Jun. 1, 1982

[54] EXTRUSION DIE WITH MELT FLOW CONTROL

[75] Inventors: John L. Fulton, Northampton; Harold H. Hopfe, Longmeadow, both of Mass.

[73] Assignee: Monsanto Company, St. Louis, Mo.

[21] Appl. No.: 187,105

[22] Filed: Sep. 15, 1980

[51] Int. Cl.³ ............................ B29F 3/04; B29F 3/08
[52] U.S. Cl. ................................ 425/461; 264/40.6; 425/378 R; 425/379 R; 425/381; 425/466
[58] Field of Search ............... 264/40.6; 425/461, 465, 425/466, 378 R, 379, 141, 143, 144, 380–381

[56] References Cited

U.S. PATENT DOCUMENTS

| | | | |
|---|---|---|---|
| 2,549,569 | 4/1951 | Bradley | 425/144 |
| 2,814,070 | 11/1957 | Bulkley et al. | 425/144 |
| 3,341,388 | 9/1967 | Bunyea | 156/244 |
| 3,608,145 | 9/1971 | Baker et al. | 264/40.6 |
| 3,609,809 | 10/1971 | Slicker | 425/379 |
| 3,761,553 | 9/1973 | Richardson | 264/40 |
| 3,767,346 | 10/1973 | Mihalik | 425/378 R |
| 3,819,775 | 6/1974 | Mules | 264/40 |
| 3,883,279 | 5/1975 | Heyer | 425/141 |
| 3,940,221 | 2/1976 | Nissel | 425/141 |
| 4,129,630 | 12/1978 | Etchu et al. | 264/22 |
| 4,252,519 | 2/1981 | Farmer et al. | 425/141 |

FOREIGN PATENT DOCUMENTS 2234876 1/1973 Fed. Rep. of Germany ...... 425/144
1396538 6/1975 United Kingdom .

Primary Examiner—Jeffery R. Thurlow
Attorney, Agent, or Firm—David Bennett; William J. Farrington; Paul D. Matukaitis

[57] ABSTRACT

An extrusion die block providing a useful means of obtaining a polymer sheet with a highly efficient degree of gauge control comprises an extrusion passage defined by opposed surfaces and terminating in an extrusion orifice, at least one of said surfaces being provided with heating means comprising a plurality of elongated heater elements located within the die block at a distance of not more than 10 mm from the surface to be heated thereby, said elements being oriented in parallel with the major axis of each in the direction of extrusion.

5 Claims, 6 Drawing Figures

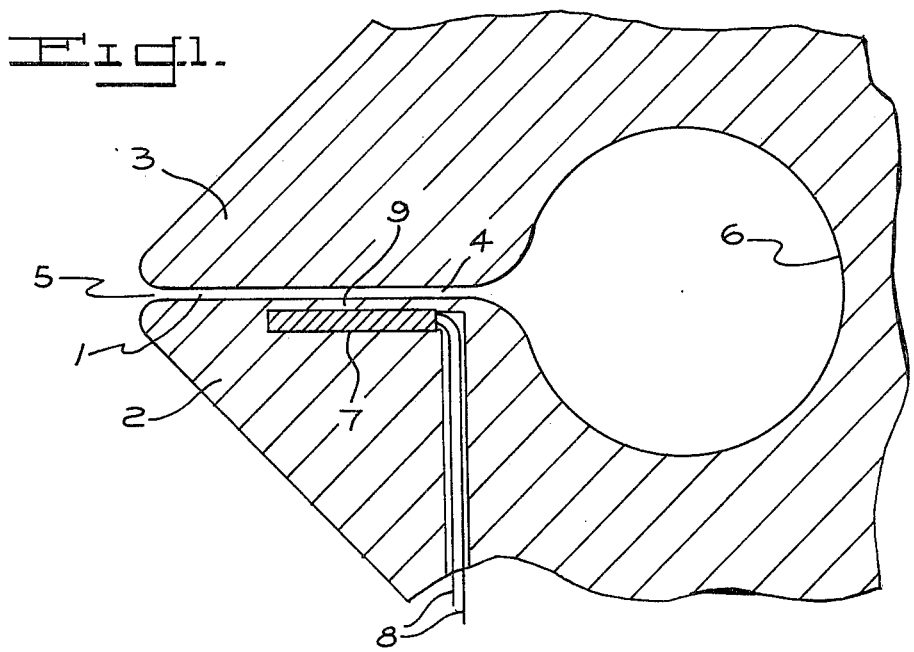
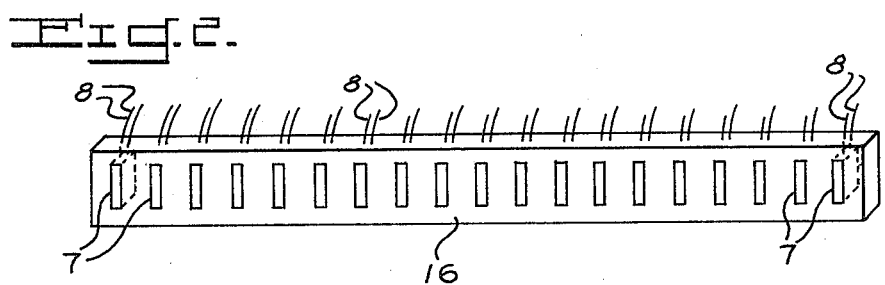
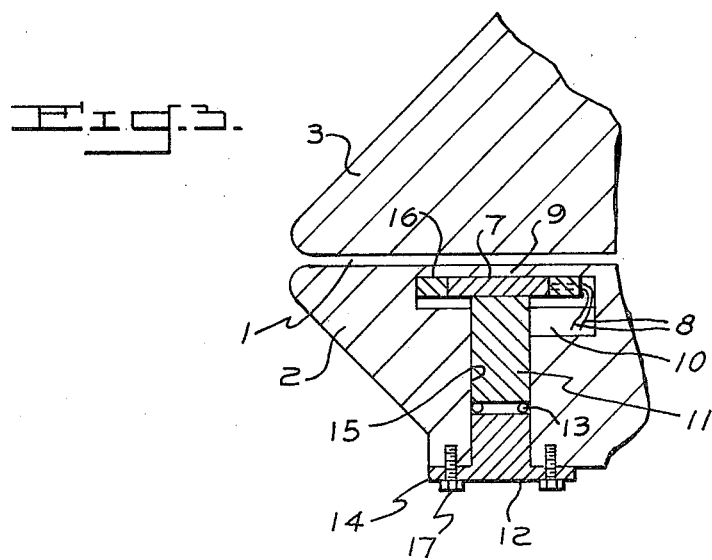

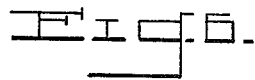
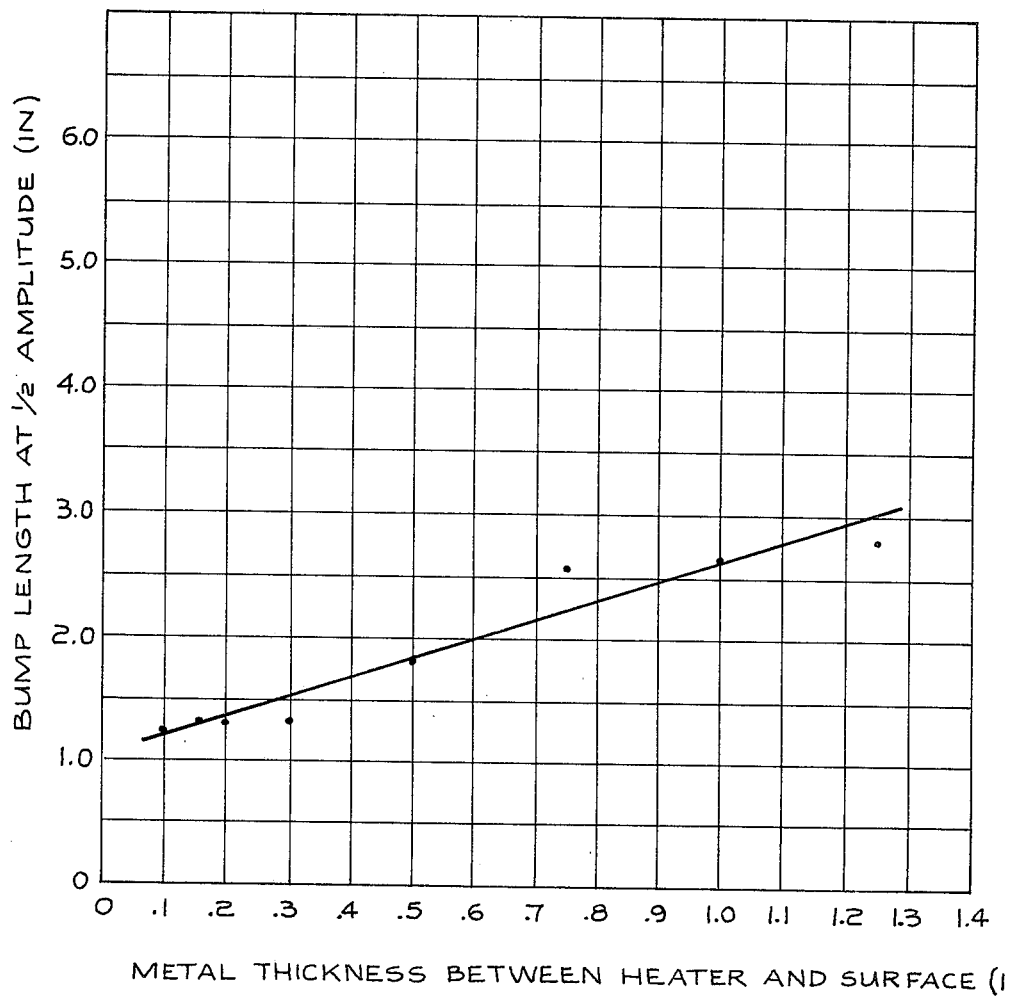

EXTRUSION DIE WITH MELT FLOW CONTROL

BACKGROUND OF THE INVENTION

This invention relates to die lips for use with extrusion dies of the type adapted to produce sheets of a thermoplastic polymer. It relates particularly to lips adapted for use in extrusion processes where it is important to maintain a careful control over the thickness of the extruded sheet.

The extrusion of a polymer between the lips of a sheet die gives a superficially uniform product but if the gauge is monitored, minor thickness variations are often found in the cross machine direction as well as in the direction of extrusion. These can be caused by uneven lip separation along the slit, differential temperatures within the polymer melt such that the amount of swell that occurs as the polymer exits the slit varies, or the presence of minor inhomogeneities in the melt.

It is often important to produce a polymer sheet of great gauge uniformity so that the resolution of this problem of gauge variation can be a very significant commercial goal.

DISCUSSION OF THE PRIOR ART

The earliest approach to gauge control was to provide that one of the die lips be moveable in response to the adjustment of the plurality of jack-bolts located along its length so as to control the separation between the opposed lips. This approach however leaves a substantial time lapse between the identification of the gauge variation problem and its correction. Moreover, the adjustment is a matter of trial and error and needs much experience on the machine with specific polymers before it can be done with any degree of efficiency.

An alternative mechanical approach is to provide that at least one of the lips is flexible to the extent it can be locally deformed by physical pressure to provide local adjustment of the die gap. This approach was shown in U.S. Pat. No. 2,938,231 in which the jack bolts conventionally used to adjust the die gap thickness were elongated and provided with heater mechanisms such that activation of the heater mechanism associated with a bolt caused the bolt to expand and locally deform the flexible lip thus narrowing the slit at that point.

This approach was refined in U.S. Pat. No. 3,940,221 which added to the earlier device a cooling means associated with each bolt so as to permit adjustment by contraction as well as expansion of the bolt and therefore a more rapid response to the need for adjustment. One specific problem encountered with such gauge control devices is that of non-local and interactive effects such that adjustment of several bolts is typically required to control one minor area of gauge variation. This problem is a serious limitation on the utility of such devices.

One solution to this gauge uniformity problem is to control the temperature of the die lip along its length so as to provide that perceived thickness variations can be corrected by increasing or decreasing the die lip temperature, and hence that of the polymer melt in contact therewith, in the region of the thickness variations. This approach is exemplified in U.S. Pat. No. 3,819,775. The approach in this patent is to provide heater elements inside the die block that are separated by air spaces so that the heating effect of each is isolated to some extent and local response can be obtained. This approach unfortunately requires that the whole die lip be heated and gives rise to expansion forces within the block which can themselves distort the die. Additionally the need to have thermal isolation of the heater elements one from another effectively reduces the numbers of heaters that can be located along the length of the die and hence the degree of fine control that can be obtained.

The approach of selectively heating the die was tried also in U.S. Pat. Nos. 3,341,388 and 3,761,553. These represent, in a sense, opposed extremes as regards location of the heating elements. The earlier patent discloses actually heating the die itself such that the temperature of the block is raised in the appropriate location. This however has the problem that localization of the effect is difficult and expansion problems can raise complications. The later patent simply provides for the mounting of heater elements on the outside face of the die lip. Here again however the problem of thermal isolation of the heating effect arises and additionally for many polymer extrusion processes it is not desirable to have substantial surface temperature variations across a sheet after it has exited the die. Such variations can have a critical adverse effect on the surface quality of the sheet.

Thus the heating approaches described in the prior art are restricted in their usefulness by the use of heater elements that are designed to heat up the body of the die and therefore need some provision for thermal isolation from one another if they are to be effective. This is both energy wasteful and necessarily limited since the use of large heaters carries the need for thermal isolation of the heaters, which in turn limits the permissable proximity of the heaters in position in the die.

The present invention provides a means of achieving improved uniformity of gauge in an extruded sheet using a selectively heated die lip approach in which the heater is small and so requires no thermal isolation, and produces a sheet in which surface temperature variations across the width of the sheet are minimal. In addition the heaters are so efficient and localized in their effect that the distance between the heaters can be made very small without adverse consequences. This results in energy economy and accurate, fine adjustment of gauge, especially where a link is established between downstream gauge measurement devices and the heater elements to permit rapid automatic actuation of the elements to correct any perceived gauge variations.

GENERAL DESCRIPTION OF THE INVENTION

The present invention provides an extrusion die block having an extrusion passage defined by opposed surfaces, at least one of said surfaces being provided with heating means comprising a plurality of elongated heater elements located within the die block at a uniform distance "d" of not more than 10 mm from the surface to be heated thereby, said elements being oriented in parallel with the major axis of each in the direction of extrusion.

The extrusion die block of the invention can take the form of a straight slit die or any other conventional configuration such as an annular die. The die block can be adapted for extrusion directly into an air space or into a passage defined by an angled face of the die block (or an attachment thereto) and a rotatable roll. Both opposed surfaces can be provided with heater elements though usually this is not necessary. For the sake of simplicity the invention will be further described in terms of a slit die extrusion device having an extrusion passage defined by opposed surfaces in which one surface is provided with heating means according to the invention. It should however be understood that the general scope of the invention is not so limited.

The location of the heaters is as close as possible to a surface defining, in part, the extrusion passage. It is generally not desirable that it form a part of the extrusion passage surface since this makes it difficult to avoid leaks around the heaters. The limitations are therefore essentially mechanical in that the die lip needs to have adequate rigidity and structural strength to be able to maintain the uniformity of the die slit separation and the substantial constancy of the dimensions of the extrusion passage. It is found that these concerns are adequately met if the thickness of the die lip metal separating the heater from the extrusion passage surface is at least 1.5 mm and preferably at least 2.0 mm. Excellent results have been obtained with a separation of about 2.5 mm.

Of course the greater the separation of the heater from the surface of the extrusion passage, the more the disadvantages of the prior art come into play. More of the lip has to be heated to produce the effect. The thermal effects begin to overlap significantly and expansion problems may disrupt the adjustment process. Therefore, separations in excess of 10.0 mm between the heater and the extrusion passage are not appropriate. In practice the separation between the heater element and the surface should preferably be from 2 to 3 mm.

The heaters are oriented with their major axes parallel in the direction of extrusion. Convenient heaters are cylindrical with a length of about 25 mm and a diameter of about 6 mm though other configurations such as rectangular plates or elongated plates with triangular cross-section can be used. The separation between the heater elements "l" can be as little as 2 cm between centers but is preferably from 3 to 10 cm between centers to obtain maximum advantage from the invention.

It is important that the distance between adjacent heaters should be relatively large by comparison with the separation between the heater and the surface of the extrusion passage. As indicated above the ratio of these distances should be at least 8:1 and is preferably 10:1 to 20:1. In this way interaction between the adjacent heaters is minimized and accurate control is more readily established.

By placing the heaters in close promimity to the surface to be heated, and therefore to the resin stream contacting the surface when the extrusion block is in use, it is possible to use comparatively small temperature increases in a highly localized area to achieve any viscosity (and therefore sheet gauge) adjustment required. This means also that the temperature variations across the surface of the resin sheet are quickly dissipated. As a result any temperature variations across the surface of the polymer stream or between the surface and the interior of the polymer stream are minimal as the polymer leaves the extrusion orifice to form an extruded sheet. This can be very important if the sheet is subjected to other processes directly it is formed and the uniformity of the surface quality of the sheet is important. If for example an extruded sheet is wound on a roller with a microroughened surface while such surface variations in temperature exist, the surface quality of the sheet obtained may likewise vary.

The configuration described in this invention also minimizes the bulk polymer temperature variation and confines the viscosity variation effect essentially to the surface of the polymer melt flow passing through the extrusion device.

Because the heaters are located so close to the polymer melt surface and because the desired effect is achieved if the temperature of essentially only the surface of the melt flow is affected, the power output of each heater element can be very small, for example from 50 to 200 watts and preferably from 100 to 150 watts. Moreover because the power output is very small, the flowover effect is minimal such that thermal isolation by means of air gaps is not required between adjacent heaters. Also, because of the low power output the temperature of the part of the die adjacent to the die orifice is not significantly affected by activation of any adjacent heater such that any significant temperature variations in the polymer or across the polymer surface have time to dissipate.

In a preferred embodiment the heaters are located in a metal bar which fits into a cooperating slot cut throughout the length of a die lip such that the heaters have the required orientation. The bar and the heater elements are preferably braced against the metal of the die lip such that the heat generated by the heater is conducted directly to the lip metal and thence to the polymer melt.

The die block can incorporate a die blade that can be structured for coarse adjustment of the die slit orifice by any of the mechanical means described in the art including screw adjustment, deformation by expanding/contracting bolts and the like.

In a preferred embodiment, the extrusion slit communicates directly with the surface of a roll which rotates such that the die lip of the invention is upstream of the die lip defining the other edge of the slit die. This technique is often advantageous when a micro-rough textured surface is to be imparted to one surface of the sheet extruded.

DESCRIPTION OF THE DRAWINGS

FIG. 1 is an idealized cross-section of an extrusion die according to the invention.

FIG. 2 is a perspective view of a bar comprising inset heater elements which can be inserted into a corresponding slot in a die block according to the invention.

FIG. 3 is a simplified cross-sectional view of a die block according to an alternative embodiment of the invention in which the heater elements are carried in a bar as described in FIG. 2.

FIG. 6 is a graph illustrating the extent of surface temperature variation with the distance of the heater from the surface.

DESCRIPTION OF THE PREFERRED EMBODIMENTS

The invention is now more fully described in relation to the attached drawings which illustrate optional embodiments of the invention but are not intended to imply any essential limitations to the invention beyond those elsewhere described.

In FIG. 1 an extrusion passage, 1, is defined by opposed surfaces, 2 and 3, and connects the manifold, 6, with the extrusion orifice, 5. An elongated heated element, 7, is located in the die block adjacent the surface, 2, with its major axis aligned in the direction of extrusion. The connector leads, 8, of the element pass through the block and are connected to a power source (not shown). The thickness of the strip of metal, 9, of the die between the heater element and the extrusion passage, 1, is about 2.5 mm.

In use a polymer flowing through the extrusion passage, 1, and out of the extrusion orifice, forms a sheet the thickness of which is determined by a gauge measuring apparatus (not shown) located downstream. A decrease in thickness recorded by the gauge measuring apparatus leads to a signal to the heater element corresponding to the location, in the cross-machine direction, of the decreased thickness. Current flowing through the heater raises its temperature and this heat is rapidly conducted through the thin strip, 9, to the polymer melt. The decrease in viscosity of the surface layer produced leads to a flow of the extruding polymer so as to correct the decreased thickness. The unheated portion of the extrusion passage allows substantial equalization of any imposed temperature variations such that as the sheet leaves the extrusion orifice no significant temperature variations exist either across the sheet surface or between the surface and the sheet interior.

In FIG. 2, the heater elements 7, are shown located in a bar, 16, which may then be placed in a cooperating slot in a die lip as shown in FIG. 3.

In FIG. 3, the slot, 15, has a roughly T-shaped cross-section with the cross bar accomodating the bar, 16, holding the heater element, 7, whose connector leads, 8-pass along a portion of the slot, 10, to a suitable power source. A spacer block, 11, cooperates with a plug, 12, and a deformable rubber O-ring, 13, to force the heater into contact with metal strip, 9. The plug, 12, is an extension of bar, 14, which is secured to the die lip by bolts, 17. Adjacent heater elements along the bar, 16, are provided with similar plug extensions of the bar, 14, rubber O-rings, 13, and spacers, 11, to ensure firm contact with the metal strip, 9.

Figure 4:
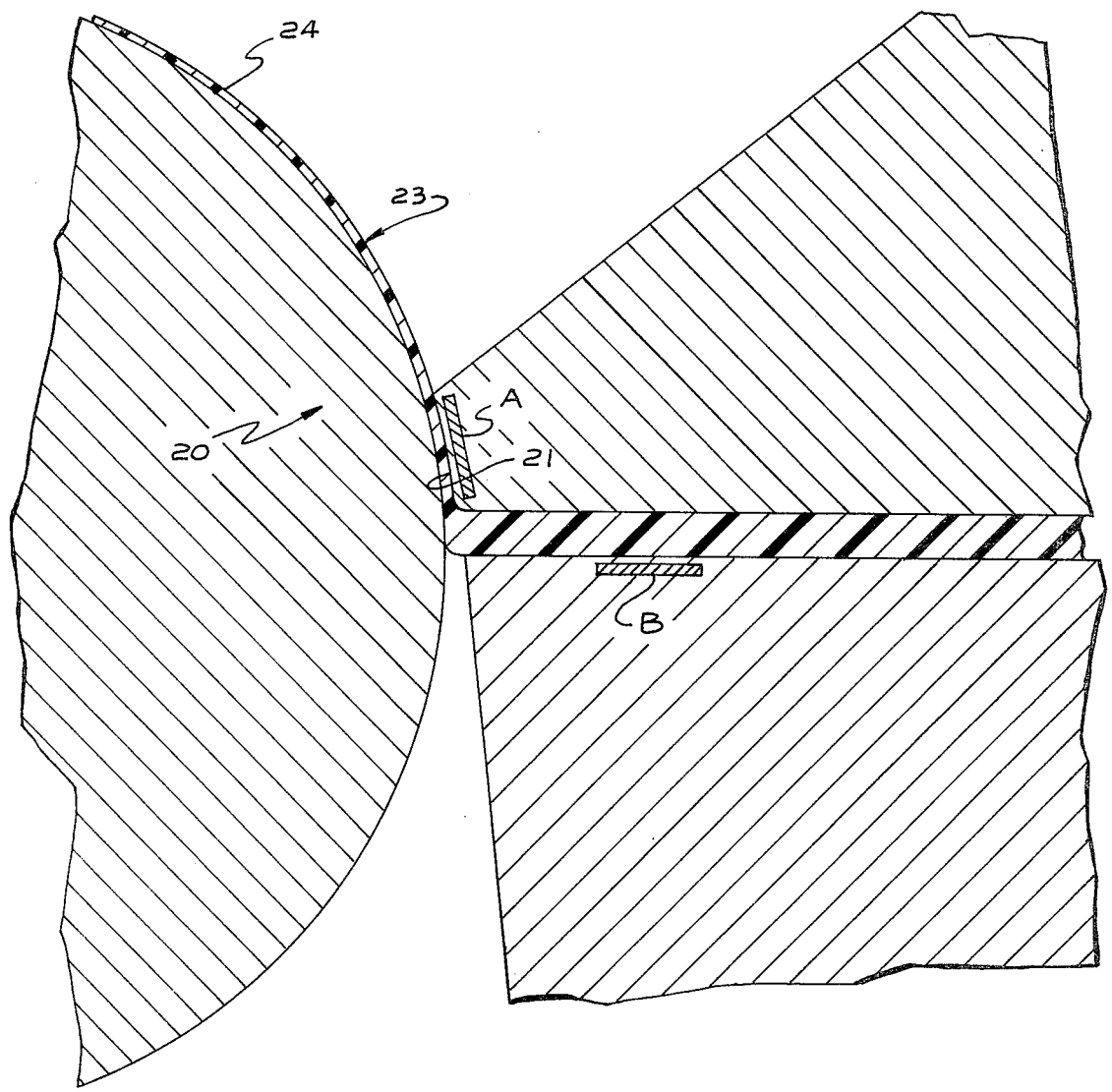
FIG. 4 is a simplified cross-sectional view of a further alternative embodiment of the invention.

To illustrate the very localized surface effect of the heater devices of the invention a polymer melt was extruded through the extrusion device illustrated schematically in FIG. 4. In that drawing heater elements A and B are located about 2.5 mm from opposing surfaces defining an extrusion passage through a die block. The extrusion passage communicated directly with a space defined by the surface of a rotatable roll 20 and an opposed machined face, 21, of the die block. The width of the extrusion passage was 7.6 mm, the gap between the die and the roll at the exit point was 1.3 mm and the extruded polymer had a thickness of about 0.8 mm. The polymer melt temperature as it passed through the extrusion passage was approximately 204° C. The rotating roll surface was maintained at 66° C.

Heater A was activated to raise its temperature by a fixed amount and the surface temperature of the sheet, 24, was measured at a point, 23, shortly after it passed out of contact with the die block corresponding to the location of the heater element in the cross-machine direction. The difference in surface temperature before and after the activation of the heater was 22° C. By contrast, when heater B was activated to exactly the same degree the surface temperature at the same point was raised by 22° C. This shows that the temperature variation produced is essentially a surface phenomenon and has very little effect on the bulk temperature of the polymer melt.

Of course this level of activation of the heaters would not normally be used in practice since much lower temperature adjustments would usually be adequate to adjust gauge variations. Such lower temperature variations would be largely dissipated by the time the polymer leaves the extrusion device.

These findings are in accord with conclusions that can be derived from heat penetration theory regarding the extent to which a polymer is heated by contact with a heated surface during extrusion.

According to the theory the thermal penetration thickness, or $\gamma_t$, (the distance from a heated surface beyond which the temperature of the extrudate is changed less than 1%), is related to the thermal diffusivity of the polymer, $\alpha$, and the contact time, t, by the formula:

$$\delta_t = 4\sqrt{\alpha_t}$$

and t is given by the formula $t=(Y1w/Q)$ where y is the separation of the surfaces forming the flow channel; 1 is the length of the heated surface in the flow direction, w is the width of the die exit flow channel and Q is the volumetric flow rate of the extruding polymer.

From this relationship there are two obvious conclusions. First, if you want to minimize the bulk heating of the polymer, i.e. minimize $\delta_t$ such that the viscosity modification is kept so far as possible to a surface effect, it is vital to reduce the contact time. This means in practice that you should have as small a value of "1" as possible. The prior art devices which heat large segments of the die are not equipped to minimize "1" and hence have to endure the consequences of substantial bulk heating.

The second conclusion is that if y is in fact several times larger than $\delta_t$ the bulk temperature of the flow stream will not be greatly influenced since most of the heating effect will be confined to a relatively thin surface layer.

In an application of the above theory to an extrusion flow of polyvinyl butyral (which has a thermal diffusivity of 0.000645 sq.cm/sec) through an extrusion device with the extrusion conditions such that Q=787 cc/sec, W=203 cm, 1=2.54 cm, y=0.76 cm, the contact time "t" is found to be 0.5 second.

Applying this to the calculation of $\delta_t$ we obtain a value of 0.072 cm which is only 9.5% of the thickness of the extruded sheet.

This calculation shows that for an extrudate of reasonable thickness the value of "1" is critical in ensuring that the heating applied is, so far as possible, only a surface phenomenon. Where this is the case the surface temperature variations are quickly dissipated once the extrudate is removed from contact with the heater.

By minimizing the value of "1" the present invention reduces thermal penetration thickness and hence ensures that the extrudate sheet has minimal surface temperature variations. The prior art devices it should be noted heat whole segments of die giving a much greater value of "1" and substantial surface temperature variations in the extrudate.

The device can be used to extrude uniform sheets of a wide range of thermoplastic polymers including polyolefins, polyesters, polyvinyl esters including copolymers of vinyl esters, polyvinyl acetals, polyvinyl halides, polycarbonates and styrenic polymers as well as compatible mixtures of such polymers.

EXAMPLE

This example illustrates the close control over surface temperature variation and the localization of effect that can be obtained if the heaters are located close to the surface of the extrusion passage.

The demonstration was performed using a steel block with approximate dimensions 5 cm×15 cm×30 cm, that is approximately those of that portion of an extrusion die block providing one surface of an extrusion slit die channel connecting the manifold with the die orifice.

The block was drilled with a series of holes about 0.6 cm in diameter and adapted to receive in a tight fit a cylindrical heater element about 2.5 cm long having an output capacity of 150 watts. The holes were drilled parallel to a major surface and at various depths below that same surface.

The center of the block was drilled with a 0.9 cm×30 cm hole adapted to circulate cooling water through the block at a rate of 9 grams per minute. This served the basic function of removing heat from the block when the heater was activated. A smaller amount of heat would of course be lost from the block surfaces by radiation and convection. The surfaces of the block were painted black to provide good radiating surfaces.

The heater was placed in one of the holes, the cooling water circulation was initiated and the heater was switched on at full power. After the system had reached an approximately stable equalibrium condition (90% complete after five minutes) the major surface adjacent to which the heater was located was scanned using an infra-red scanner.

The base temperature, To, (the temperature before the heater was activated) and the maximum temperature reached, Tmax, were noted and the bump length at half amplitude, that is the distance on either side of the line of the heater in which the temperature exceeded half of Tmax-To was measured. This gave an idea of how far the influence of the heater extended beyond the immediate vicinity of the heater or what is herein termed the "influence zone width". This zone width was determined for a range of separations between the heater and the block surface and the results were plotted in the form of a graph (FIG. 6 of the attached drawings).

Figure 5:
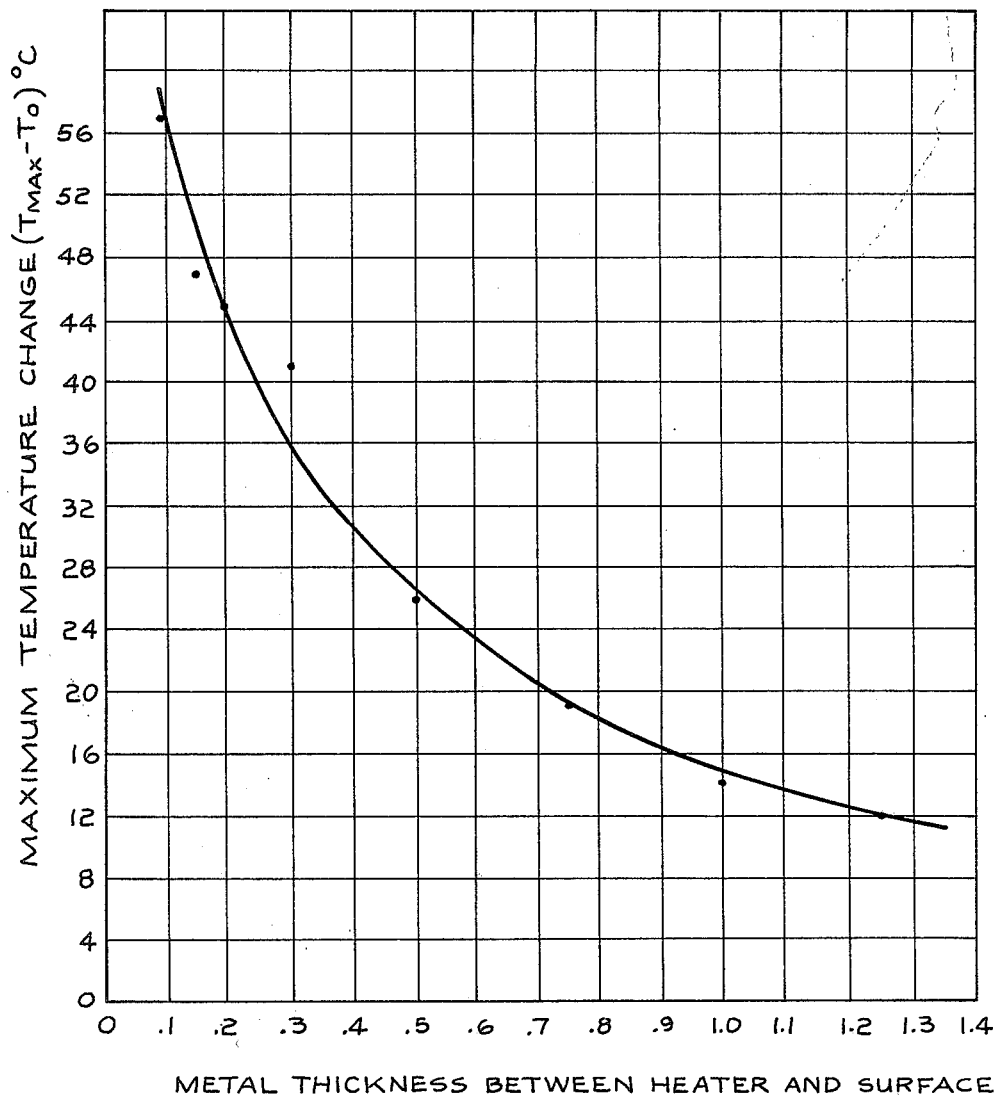
FIG. 5 is a graph of surface temperature change when a heater element is located at varying distances from the surface.

In addition a graph was plotted of the value of Tmax-To against the separation between the heater and the surface and the results are shown on FIG. 5 of the attached drawings.

The results of these evaluations clearly show that the closer the heater is to the surface, the greater the achievable temperature change that can be achieved for a given heater power output and the closer the heater to the surface, the more localized is the effect of the heater. The results show then that a heater located very close to an interior die block surface providing one surface of an extrusion passage is capable of producing a significant highly localized effect and that the corresponding effect when the separation between the heater and the surface is increased is correspondingly more diffuse and less significant.

In more concrete terms reducing the heater/surface separation from 12.3 mm to 2.5 mm the value of Tmax-To, which is in practice the driving force behind the gauge alteration mechanism used by the apparatus of the invention, is doubled and the area heated, which indicates the degree to which a heater's influence can be separated from that of adjacent heaters, is reduced by 35%.

In summary then it is clear from the above that placing the heater as close as possible to the surface permits very localized and efficient heating to adjust the viscosity of a resin flow in an extrusion passage.

It is foreseen that many minor modifications and variations described herein could be made without departing from the essential concept of the invention. It is intended that all such minor modifications and variations shall be embraced within the purview of this invention.

What is claimed is:

1. An extrusion die block having an extrusion passage defined by opposed surfaces, at least one of said surfaces being provided with heating means comprising a plurality of elongated heater elements located within the die block at a uniform distance, "d", of 1.5 to 10 mm. from the surface to be heated thereby, said elements being oriented in parallel, with the major axis of each in the direction of extrusion, the between centers spacing, "l", of adjacent heaters being from 2 to 10 cm. and the ratio of 1 to d being at least 8:1.

2. An extrusion die block according to claim 1 in which the heater elements are located at a uniform distance of from 2 to 3 mm from the surface to be heated thereby.

3. An extrusion die block according to claim 1 in which the heaters are carried in a bar adapted for insertion in a corresponding aperture in the die block.

4. An extrusion die block according to claim 1 in which the ratio of l to d is from 10:1 to 20:1.

5. An extrusion die block having an extrusion passage defined by opposed surfaces, at least one of said surfaces being provided with a plurality of elongated heater elements located in a bar adapted to fit in a corresponding aperture in the die block such that the heater elements are arranged in parallel fashion with the major axis of each oriented in the direction of extrusion and with each heater element in contact with the metal of the die block, located at a uniform distance of from 2 to 3 mm. from the surface to be heated thereby, and separated from one another by from 3 to 10 cm., measured between centers, and the ratio of said separation to said distance being from 10:1 to 20:1.

* * * * *